US012248604B2

(12) United States Patent
Ghazi et al.

(10) Patent No.: US 12,248,604 B2
(45) Date of Patent: Mar. 11, 2025

(54) SCALABLE AND DIFFERENTIALLY PRIVATE DISTRIBUTED AGGREGATION

(71) Applicant: Google LLC, Mountain View, CA (US)

(72) Inventors: Badih Ghazi, San Jose, CA (US); Rasmus Pagh, Berkeley, CA (US); Ameya Velingker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 355 days.

(21) Appl. No.: 17/620,438

(22) PCT Filed: Jun. 17, 2020

(86) PCT No.: PCT/US2020/038109
§ 371 (c)(1),
(2) Date: Dec. 17, 2021

(87) PCT Pub. No.: WO2020/257264
PCT Pub. Date: Dec. 24, 2020

(65) Prior Publication Data
US 2022/0374542 A1 Nov. 24, 2022

Related U.S. Application Data

(60) Provisional application No. 62/863,197, filed on Jun. 18, 2019.

(51) Int. Cl.
*G06F 21/62* (2013.01)
(52) U.S. Cl.
CPC ............................. *G06F 21/6245* (2013.01)

(58) Field of Classification Search
CPC ....... G06F 21/60; G06F 21/62; G06F 21/6245
See application file for complete search history.

(56) References Cited

U.S. PATENT DOCUMENTS

| 2016/0182170 A1* | 6/2016 | Daoura | H04W 12/033 |
| | | | 455/3.01 |
| 2018/0039855 A1* | 2/2018 | Kecskemeti | G06F 21/6254 |

(Continued)

OTHER PUBLICATIONS

Abadi et al., "Deep Learning with Differential Privacy", arXiv:1607.00133v2, 14 pages.

(Continued)

*Primary Examiner* — Dao Q Ho
(74) *Attorney, Agent, or Firm* — DORITY & MANNING P.A.

(57) ABSTRACT

An encoding process performed by a computing device (e.g., a user's private device) can include obtaining private data that includes a private value. According to an aspect of the present disclosure, the computing device can produce a plurality of messages that respectively comprise a plurality of message values, where a total sum of the plurality of message values approximates the private value, and where at least one of the plurality of message values is randomly selected. The device can provide the plurality of messages for aggregation with a plurality of additional messages respectively generated for a plurality of additional private values. For example, the messages can be transmitted to a shuffler model configured to shuffle the plurality of messages with the plurality of additional messages.

14 Claims, 4 Drawing Sheets

(56) References Cited

U.S. PATENT DOCUMENTS

2020/0372061 A1* 11/2020 Gao ............... H04N 21/25891
2022/0374542 A1* 11/2022 Ghazi ............... G06F 21/6245

OTHER PUBLICATIONS

Balle et al., "Differentially Private Summation with Multi-Message Shuffling", arXiv:1906.09116v1, 8 pages.
Balle et al., "Improved Summation from Shuffling", arXiv:1909.11225v1, 13 pages.
Balle et al., "The Privacy Blanket of the Shuffle Model", arXiv:1903.02837v1, 36 pages.
Bittau et al., "PROCHLO: Strong Privacy for Analytics in the Crowd", arXiv:1710.00901v1, 20 pages.
Bonawitz et al., "Practical Secure Aggregation for Privacy-Preserving Machine Learning", 2017 ACM SIGSAC Conference, Oct. 30-Nov. 3, 2017, Dallas, Texas, pp. 1175-1191.
Cheu et al., "Distributed Differential Privacy via Shuffling", arXiv:1808.01394v3, 42 pages.
Cormode et al., "Synopses for Massive Data: Samples, Histograms, Wavelets, Sketches", Foundation and Trends in Databases, vol. 4, Nos. 1-3, 2011, pp. 1-294.
Erlingsson et al., "Amplification by Shuffling: From Local to Central Differential Privacy via Anonymity", 2019 Annual ACM-SIAM Symposium on Discrete Algorithms, Jan. 6-9, 2019, San Diego, California, pp. 2468-2479.
Ghazi et al., "Private Aggregation from Fewer Anonymous Messages", arXiv:1909.11073v1, 31 pages.
Ghazi et al., "Scalable and Differentially Private Distributed Aggregation in the Shuf ed Model", arXiv:1906.08320v3, 18 pages.
Google AI Blog, "Federated Learning: Collaborative Machine Learning without Centralized Training Data", Apr. 6, 2017, https://ai.googleblog.com/2017/04/federated-learning-collaborative.html, retrieved on Jan. 19, 2022, 4 pages.
Goryczka et al., "Secure Multiparty Aggregation with Differential Privacy: A Comparative Study", Joint EDBT/ICDT 2013 Workshops, Mar. 18-22, 2013, Genoa, Italy, pp. 155-163.
He et al., "PDA: Privacy-preserving Data Aggregation in Wireless Sensor Networks", IEEE INFOCOM 2007, 10 pages.
International Preliminary Report on Patentability for Application No. PCT/US2020/038109, mailed Dec. 30, 2021, 8 pages.
Ishai et al., "Cryptography from Anonymity", $47^{th}$ Annual IEEE Symposium on Foundations of Computer Science (FOCS'06), Oct. 21-24, 2006, Berkeley, California, pp. 239-248.
Kearns, "Efficient Noise-Tolerant Learning From Statistical Queries", Journal of the ACM, vol. 45(6), 1998, pp. 983-1006.
McMahan et al., "Federated Learning of Deep Networks using Model Averaging", arXiv:1602.05629v1, 11 pages.
Shi et al., "PriSense: Privacy-Preserving Data Aggregation in People-Centric Urban Sending Systems", IEEE INFOCOM 2010, 10 Pages.
Woodruff et al, "Sketching as a Tool for Numerical Linear Algebra", arXiv:1411.4357v1, 141 pages.

* cited by examiner

Algorithm 1: Invisibility Cloak Encoder Algorithm $E_{N,k,m}(x)$:
    Input: $x \in \mathbb{R}$, integer parameters $N, k, m \geq 4$
    Output: Multiset $\{y_1, \ldots, y_m\} \subseteq \{0, \ldots, N-1\}$ Let $\bar{x} \leftarrow \lfloor xk \rfloor$
    for $j = 1, \ldots, m-1$ do
        $y_j \leftarrow \textit{Uniform}(\{0, \ldots, N-1\})$
    $y_m \leftarrow \left(\bar{x} - \sum_{j=1}^{m-1} y_j\right) \bmod N$
    return $\{y_1, \ldots, y_m\}$

Figure 3

Algorithm 2: Analyzer $\mathcal{A}_{N,k,n}(y_1, \ldots, y_{mn})$:

Input: $(y_1, \ldots, y_{mn}) \in \{0, \ldots, N-1\}^{mn}$, integer parameters $k$, $n$, odd $N > 3nk$

Output: $z \in [0, n]$ $z \leftarrow \sum_i y_i \bmod N$ if $z > 2nk$ then return $0$;

else if $z > nk$ then return $n$;

else return $z/k$;

Figure 4

SCALABLE AND DIFFERENTIALLY PRIVATE DISTRIBUTED AGGREGATION

This application is based upon and claims the right of priority under 35 U.S.C. § 371 to International Application No. PCT/US2020/038109 filed on Jun. 17, 2020, which claims priority to and the benefit of U.S. Provisional Patent Application No. 62/863,197 filed Jun. 18, 2019. Applicant claims priority to and the benefit of each of such applications and incorporates all such applications herein by reference in their entirety.

FIELD

The present disclosure relates generally to distributed aggregation. More particularly, the present disclosure relates to scalable and differentially private distributed aggregation, for example, in the shuffled model.

BACKGROUND

Given a number of different private values that reside on a number of different devices, it may be desirable to compute a sum and/or mean of such private values. This basic problem is used as a subroutine in several learning and optimization tasks where data is distributed across several clients.

However, it may also be desirable to compute such sum or mean in a privacy-preserving way, such that no device other than the client device has access to or the ability to compute the private value (with some guarantees). This process may be referred to as secure and distributed aggregation.

One example scenario in which such secure and distributed aggregation is desirable is federated learning. Federated learning promises to make machine learning feasible on distributed, private datasets by implementing gradient descent using secure aggregation methods. The idea is to compute a global weight update without revealing the contributions of individual users.

Current practical protocols for secure aggregation work in an "honest but curious" setting where a curious adversary observing all communication to and from the server cannot learn any private information assuming the server is honest and follows the protocol.

A more scalable and robust primitive for privacy-preserving protocols is shuffling of user data, so as to hide the origin of each data item. Highly scalable and secure protocols for shuffling, so-called mixnets, have been proposed as a primitive for privacy-preserving analytics in the Encode-Shuffle-Analyze framework by Bittau et al.

Recent papers by Cheu et al. and Balle et al. have formalized the "shuffled model" and suggested protocols for secure aggregation that achieve differential privacy guarantees. Their protocols come at a cost, though: Either the expected aggregation error or the amount of communication per user scales as a polynomial $n^{\Omega(1)}$ in the number of users n.

SUMMARY

Aspects and advantages of embodiments of the present disclosure will be set forth in part in the following description, or can be learned from the description, or can be learned through practice of the embodiments.

One example aspect is directed to a computer-implemented method to enable privacy-preserving aggregation of private data. The method includes obtaining, by one or more computing devices, private data comprising a private value. The method includes producing, by the one or more computing devices, a plurality of messages that respectively comprise a plurality of message values, wherein a total sum of the plurality of message values approximates the private value, and wherein at least one of the plurality of message values is randomly selected. The method includes providing, by the one or more computing devices, the plurality of messages for aggregation with a plurality of additional messages respectively generated for a plurality of additional private values.

In some implementations, producing, by the one or more computing devices, the plurality of messages that respectively comprise the plurality of message values comprises: for each of one or more first iterations associated with one or more first messages of the plurality of messages: uniformly and randomly sampling, by the one or more computing devices, one of a plurality of available values to serve as the message value for such first message; and for a final iteration associated with a final message of the plurality of messages: determining, by the one or more computing devices, an intermediate sum of the message values of the one or more first messages; and selecting, by the one or more computing devices, a final value to serve as the message value for the final message such that the total sum of the intermediate sum and the final value approximates the private value.

In some implementations, the plurality of available values comprises a set of integers extending from zero to a sample control parameter value minus one; and selecting, by the one or more computing devices, the final value to serve as the message value for the final message comprises setting, by the one or more computing devices, the final value equal to the private value minus the intermediate sum modulo the sample control parameter value.

In some implementations, a number of the one or more first iterations is controlled by a message control parameter value.

In some implementations, the private value comprises a scaled private value produced by scaling an unscaled private value; and obtaining, by one or more computing devices, the private data comprising the private value comprises scaling, by the one or more computing devices, the unscaled private value by a scaling control parameter value to obtain the scaled private value.

In some implementations, the private value comprises a normalized private value produced by normalizing a raw private value; and obtaining, by one or more computing devices, the private data comprising the private value comprises normalizing, by the one or more computing devices, the raw private value according to an expected maximum private value.

In some implementations, the method includes scaling, by the one or more computing devices, the normalized private value by a scaling control parameter value to obtain a scaled private value.

In some implementations, the private value comprises a noised private value produced by adding noise to a raw private value; and obtaining, by one or more computing devices, the private data comprising the private value comprises pre-randomizing, by the one or more computing devices, the raw private value according to a shared noise probability to obtain the noised private value.

In some implementations, one or more of the sampling control parameter value, the scaling control parameter value, and the message control parameter value comprises a user-specified hyperparameter or a learned hyperparameter.

In some implementations, one or more of the sampling control parameter value, the scaling control parameter value, and the message control parameter value is greater than or equal to four.

In some implementations, providing, by the one or more computing devices, the plurality of messages for aggregation comprises transmitting, by the one or more computing devices, the plurality of messages to a shuffler model configured to shuffle the plurality of messages with the plurality of additional messages.

In some implementations, the one or more computing devices consist of a user device.

In some implementations, the private value comprises one or more of: an update value for a parameter of a machine-learned model; a heavy hitter value; an entropy value; a quantization value; or a support size value.

In some implementations, the method includes encrypting, by the one or more computing devices, at least one of the plurality of messages.

In some implementations, the method includes encrypting, by the one or more computing devices, at least one of the plurality of messages with a public key associated with a shuffler model configured to shuffle the plurality of messages.

Another example aspect is directed to a computing system configured to perform any portion of the computer-implemented method described herein.

Another example aspect is directed to one or more non-transitory computer-readable media that collectively store instructions that, when executed by one or more processors, cause the one or more processors to perform any portion of the computer-implemented method described herein.

Another example aspect is directed to a computing system comprising: one or more processors; and one or more non-transitory computer-readable media that collectively store instructions that, when executed by the one or more processors, cause the computing system to perform operations, the operations comprising: obtaining a plurality of multisets of messages, wherein a plurality of private values are respectively associated with the plurality of multisets of messages, each multiset of messages comprising two or more messages that respectively contain two or more message values that sum to approximate the private value associated with such multiset of messages, and wherein at least one of the two or more message values comprises a random value; and aggregating the message values for the plurality of multisets of messages to obtain an aggregate sum that approximates a sum of the plurality of private values.

In some implementations, the plurality of multisets of messages have been respectively generated by a plurality of different devices, and wherein the messages have been shuffled and are randomly distributed amongst each other without regard to which of the plurality of different devices generated each message.

In some implementations, aggregating the message values for the plurality of multisets of messages comprises: determining a sum of the message values modulo a sampling control parameter value.

In some implementations, aggregating the message values for the plurality of multisets of messages comprises further comprises: downscaling the sum of the message values modulo the sampling control parameter value by a scaling control parameter value.

In some implementations, aggregating the message values for the plurality of multisets of messages comprises: determining an intermediate value that equals a sum of the message values modulo a sampling control parameter value; and performing the following return logic: if the intermediate value is greater than two times a number of the private values times a scaling control parameter value: returning zero; else if the intermediate value is greater than the number of the private values times the scaling control parameter value: returning the number of the private values; and else: returning the intermediate value divided by the scaling control parameter value.

In some implementations, aggregating the message values for the plurality of multisets of messages comprises determining, based on the aggregate sum that approximates the sum of the plurality of private values, an average value that approximates an average of the private values.

Another example aspect is directed to a computer-implemented method comprising performing any of the operations described herein.

Another example aspect is directed to one or more non-transitory computer-readable media that collectively store instructions that, when executed by one or more processors, cause the one or more processors to perform any of the operations described herein.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

U.S. Provisional Patent Application No. 62/863,197 describes example implementations of the proposed techniques in greater detail. U.S. Provisional Patent Application No. 62/863,197 is incorporated into and forms a part of this disclosure.

BRIEF DESCRIPTION OF THE DRAWINGS

Detailed discussion of embodiments directed to one of ordinary skill in the art is set forth in the specification, which makes reference to the appended figures, in which:

FIG. 3 depicts a block diagram of an example algorithm for encoding private data according to example embodiments of the present disclosure.

FIG. 4 depicts a block diagram of an example algorithm for analyzing encoded data according to example embodiments of the present disclosure.

Figure 1:
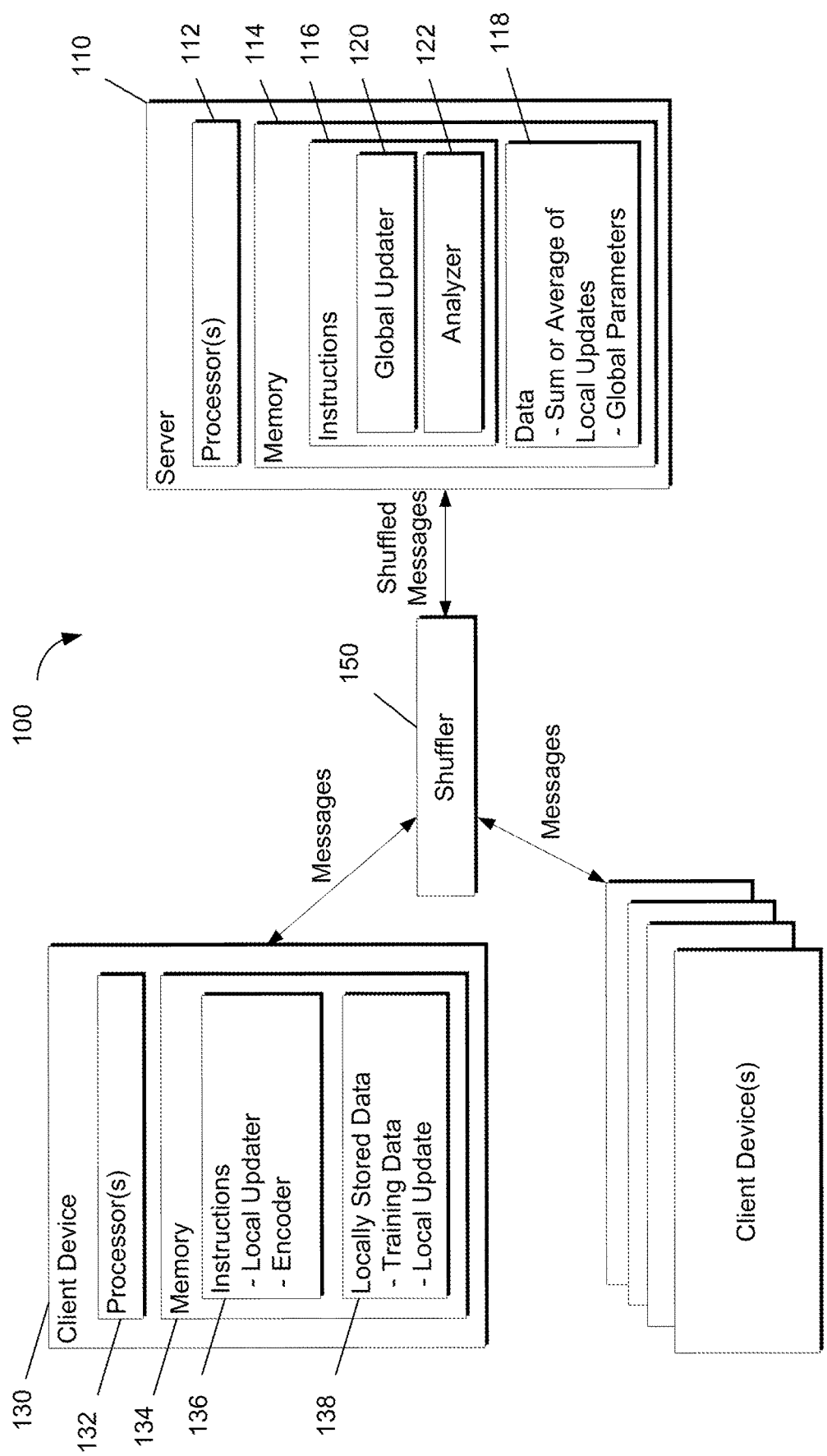
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to scalable and differentially private distributed aggregation, for example, in the shuffled model. In particular, the present disclosure proposes a simple and more efficient protocol for aggregation in the shuffled model, where communication as well as error increases only polylogarithmically in the number of users n. The proposed technique is a conceptual "invisibility cloak" that makes users' data almost indistinguishable from random noise while introducing zero distortion on the sum.

Specifically, an encoding process performed by a computing device (e.g., a user's private device) can include obtaining private data that includes a private value. According to an aspect of the present disclosure, the computing device can produce a plurality of messages that respectively comprise a plurality of message values, where a total sum of the plurality of message values approximates the private value, and where at least one of the plurality of message values is randomly selected. The device can provide the plurality of messages for aggregation with a plurality of additional messages respectively generated for a plurality of additional private values. For example, the messages can be transmitted to a shuffler model configured to shuffle the plurality of messages with the plurality of additional messages. Once all of the messages are shuffled, an analyzer can determine a sum of all private values from all users but cannot (with some guarantees) determine any single private value from any single user.

More particularly, example aspects of the present disclosure are directed to the problem of privately summing n numbers in the shuffled model recently defined by Cheu et al. For consistency with the literature, the term aggregation is used for the sum operation.

Consider n users with private data values $x_1, \ldots, x_n \in [0,1]$. In the shuffled model, user i applies a randomized encoder algorithm E that maps $x_i$ to a multiset of m messages, $E(x_i) = \{y_{i,1}, \ldots, y_{i,m}\} \subseteq \mathcal{Y}$, where m is a parameter. Then a trusted shuffler $\mathcal{S}$ takes all nm messages and outputs them in random order. Finally, an analyzer algorithm $\mathcal{A}$ maps the shuffled output $\mathcal{S}(E(x_1), \ldots, E(x_n))$ to an estimate of $\Sigma_i x_i$.

A protocol in the shuffled model is $(\varepsilon, \delta)$-differentially private if $\mathcal{S}(R_1(x_1), \ldots, R_n(x_n))$ is $(\varepsilon, \delta)$-differentially private, where probabilities are with respect to the random choices made in the algorithm E and the shuffler $\mathcal{S}$. The privacy claim is justified by the existence of highly scalable protocols for privately implementing the shuffling primitive.

Two protocols for aggregation in the shuffled model were recently suggested by Balle et al. and Cheu et al. These and all other previously known protocols have either communication or error that grows as $n^{\Omega(1)}$. This is unavoidable for single-message protocols. However, aspects of the present disclosure show that such a trade-off is not necessary—it is possible to avoid the $n^{\Omega(1)}$ factor in both the error bound and the amount of communication per user. The precise results obtained depend on the notion of "neighboring dataset" in the definition of differential privacy.

In particular, aspects of the present disclosure build upon a technique from protocols for secure multi-party aggregation: Ensure that individual numbers passed to the analyzer are fully random by adding random noise terms but coordinate the noise such that all noise terms cancel, and the sum remain the same as the sum of the original data.

Figure 2:
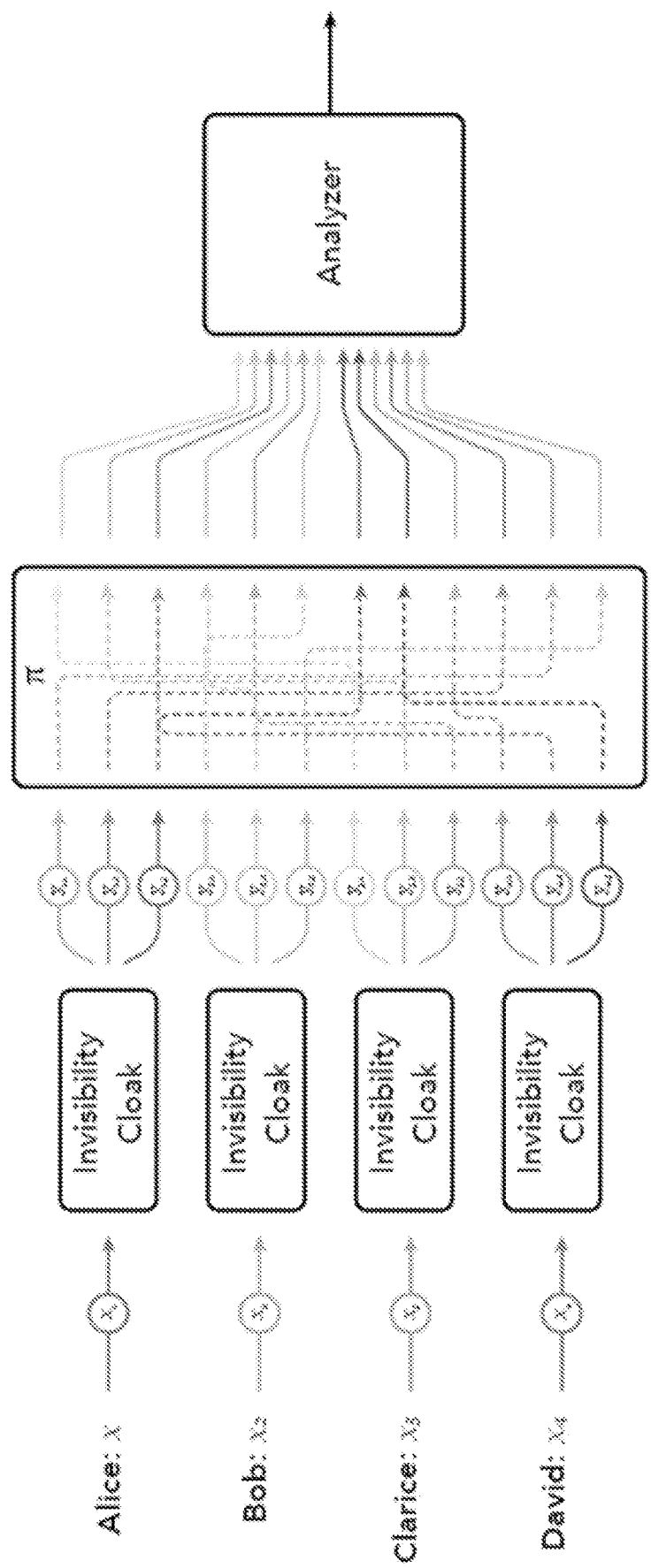
FIG. 2 depicts a block diagram of an example encoding and analysis process for secure multi-party aggregation according to example embodiments of the present disclosure.

A new insight provided herein is that in the shuffled model the addition of zero-sum noise can be done without coordination between the users. Instead, each user individually can produce numbers $y_1, \ldots, y_m$ that are fully random except that they sum to $x_i$, and pass them to the shuffler. This is visualized, for example, in FIG. 2. Conceptually the noise that is introduced acts as an invisibility cloak: The data is still there, possible to aggregate, but is almost impossible to gain any other information from.

The details of one example encoder is given as Algorithm 1, which is presented in FIG. 3. For parameters N, k, and m to be specified later it converts each input $x_i$ to a set of random message values $\{y_i, \ldots, y_m\}$ whose sum, up to scaling and rounding, equals $x_i$. When the output of all encoders $E_{N,k,m}(x_i)$ is composed with a shuffler this directly gives differential privacy with respect to sum-preserving changes of data (where the sum is considered after rounding). In Algorithm 1, the notation Uniform(R) is used to denote a value uniformly sampled from a finite set R.

In some implementations, to achieve differential privacy with respect to single-user changes the protocol can be combined with a pre-randomizer that adds noise to each $x_i$ with some probability.

One example analyzer is given as Algorithm 2, which is presented in FIG. 4. It computes z as the sum of the inputs (received from the shuffler) modulo N, which by definition of the encoder is guaranteed to equal the sum $\Sigma_i \lceil x_i k \rceil$ of scaled, rounded inputs. If $x_1, \ldots, x_n \in [0,1]$ this sum will be in [0, nk] and $\bar{z}/k$ will be within n/k of the true sum $\Sigma_i x_i$. In the setting where a pre-randomizer adds noise to some inputs, however, it may be the case that $z \notin [0, nk]$ in which case the analyzer can round to the nearest feasible output sum, 0 or n.

One example application of the techniques described herein in a machine learning context is gradient descent-based federated learning to learn a machine-learned model. The idea is to avoid collecting user data, and instead compute weight updates in a distributed manner by sending model parameters to users, locally running stochastic gradient descent on private data, and aggregating model updates over all users. Using a secure aggregation protocol guards against information leakage from the update of a single user, since the server only learns the aggregated model update.

Although federated learning is one useful application, many other applications exist as well. For example, the proposed techniques can easily be applied to other problems such as: finding heavy hitters (e.g., finding the most commonly typed words into a virtual keyboard); entropy estimation; quantile estimation; support size estimation; and/or other problems. The proposed algorithms can be used for aggregation in conjunction with any context that demonstrates the linearity property.

More particularly, although the proposed protocol is described with reference to performing sums/aggregation, it can alternatively be used to perform computation of any statistics that can be approximated by a linear sketch. The basic idea behind linear sketches is to compress a n-dimensional vector x by multiplying it by a suitable random m×n matrix A where m<<n. This gives a vector Ax of (much smaller) dimension m. Such linear sketches form the basis of efficient algorithms for a variety of estimation tasks including norms, entropy, support size, quantiles, and heavy hitters.

The systems and methods of the present disclosure provide a number of technical effects and benefits, including, as one example, reducing communication costs associated with secure aggregation of private data. In particular, current practical secure aggregation protocols such as that of Bonawitz et al. have user computation cost $O(n^2)$ and total communication complexity $O(n^2)$, where n is the number of users. This limits the number of users that can participate in the secure aggregation protocol. In contrast, in the proposed techniques, communication per user as well as error increases only polylogarithmically in n. Thus, secure aggregation can be performed with reduced communication costs. Reduced communication costs can conserve computing resources such as processor usage, memory usage, network bandwidth, and the like.

In addition, the proposed techniques can enable improved privacy. For example, the privacy analysis for many existing secure aggregation protocols assumes of an "honest but curious" server that does not deviate from the protocol, so some level of trust in the secure aggregation server is required. In contrast, protocols based on shuffling operate with much weaker assumptions on the server. In addition to this advantage, along with providing differential privacy guarantees, total work and communication of the proposed new protocol scales near-linearly with the number of users.

Further, although differential privacy is established for a number m of messages per user that is logarithmic in the number of users, much smaller values of m can be used in practice. Under standard cryptographic assumptions, the communication can be reduced by amortizing the cost of the m−1 random messages over sufficiently long input vectors. For instance, if one wishes to aggregate vectors of length d, instead of having each user sending d*(m−1) random values to the shuffler, each user can simply send (1) d random seeds that can be expanded into a pseudorandom vector of length d*(m−1), as well as (2) the true data vector with the random vectors subtracted. Thus, the communication overhead would be just a constant factor (e.g., amortized over long vectors).

In addition, one of the bottlenecks of current shuffling-based schemes is the encryption overhead incurred for messages sent from the users to the shuffler. One advantage of the proposed method is that, although there are m messages sent by each user to the shuffler, privacy can still be maintained via encryption of just one of these messages while sending the remaining messages in plaintext. This is because, by design of the protocol, any subset of m−1 messages is random and independent. Thus, reduced amounts of encryption may need to be performed, thereby conserving computing resources such as processor usage, memory usage, and the like.

The present disclosure shows that a trade-off between privacy and scalability is not necessary—it is possible to avoid the $n^{\Omega(1)}$ factor in both the error bound and the amount of communication per user. The precise results obtained depend on the notion of "neighboring dataset" in the definition of differential privacy. The present disclosure considers the standard notion of neighboring dataset in differential privacy, that the input of a single user is changed, and show:

Theorem 1. Let $\varepsilon>0$ and $\delta\in(0,1)$ be any real numbers. There exists a protocol in the shuffled model that is ($\varepsilon$, $\delta$)-differentially private under single-user changes, has expected error $$O\left(\frac{1}{\varepsilon}\sqrt{\log\frac{1}{\delta}}\right),$$

and where each encoder sends $$O\left(\log\left(\frac{n}{\varepsilon\delta}\right)\right)$$

messages of $$O\left(\log\left(\frac{n}{\delta}\right)\right)$$

bits.

The present disclosure also considers a different notion similar to the gold standard of secure multi-party computation: Two datasets are considered neighboring if the their sums (taken after discretization) are identical. This notion turns out to allow much better privacy, even with zero noise in the final sum—the only error in the protocol comes from representing the terms of the sum in bounded precision.

Theorem 2. Let $\varepsilon>0$ and $\delta\in(0,1)$ be any real numbers and let $$m > 10\log\left(\frac{n}{\varepsilon\delta}\right).$$

There exists a protocol in the shuffled model that is ($\varepsilon$, $\delta$)-differentially private under sum-preserving changes, has worst-case error $2^{-m}$, and where each encoder sends m messages of O(m) bits.

In addition to analyzing error and privacy of the proposed new protocol, this disclosure considers its resilience towards untrusted users that may deviate from the protocol. While the shuffled model is vulnerable to such attacks in general, the privacy guarantees of the proposed protocol are robust even to a large fraction of colluding users.

Various applications, use cases, or other implementations of the technologies described herein are possible. In one example, the private data can be usage metrics for a client device. In one example, a client device can be an Internet of Things device (AKA a "smart" device). Example usage metrics include hours of operation (e.g., per day), CPU usage, data usage, etc. In another example, the private data can be measurements of interaction of a user with various items of content such as photographs, webpages, documents, files, search results, or other items of content. In one example, a client device can be a user device such as, for example, a laptop, tablet, smartphone, or device that can be worn.

Example Analysis

This section first considers privacy with respect to sum-preserving changes to the input, arguing that observing the output of the shuffler gives almost no information on the input, apart from the sum. The use of "we" and "our" in this section refers to concepts and implementations of the present disclosure.

The proof strategy is to show privacy in the setting of two players and then argue that this implies privacy for n players, essentially because the two-player privacy holds regardless of the behavior of the other players. In the two-player case we first argue that with high probability the outputs of the encoders satisfy a smoothness condition saying that every potential input $x_1$, $x_2$ to the encoders corresponds to roughly the same number of divisions of the 2m shuffler outputs into sets of size m. Finally we argue that smoothness in conjunction with the 2m elements being unique implies privacy.

Example Preliminaries

Example Notation

This disclosure uses Uniform(R) to denote a value uniformly sampled from a finite set R, and denoted by $S_r$ the set of all permutations of $\{0, t-1\}$. Unless stated otherwise, sets in this disclosure will be multisets. It will be convenient to $$\binom{\mathcal{Y}}{2m}_{\gamma-smooth} = \{\{y_1, \ldots, y_{2m}\} \mid \{y_1, \ldots, y_{2m}\} \text{ is } \gamma - \text{smooth and } y_1, \ldots, y_{2m} \text{ are distinct}\}.$$

work with indexed multisets whose elements are identified by indices in some set I. We can represent a multiset $M \subseteq R$ with index set I as a function $M:I \rightarrow R$. Multisets $M_1$ and $M_2$ with index sets $I_1$ and $I_2$ are considered identical if there exists a bijection $\pi: I_1 \rightarrow I_2$ such that $M_1(i)=M_2(\pi(i))$ for all $i \in I_1$. For disjoint $I_1$ and $I_2$ we define the union of $M_1$ and $M_2$ as the function defined on $I_1 \cup I_2$ that maps $i_1 \in I_1$ to $M_1(i_1)$ and $i_2 \in I_2$ to $M_2(i_2)$ Differential Privacy and the Shuffled Model.

This disclosure considers the established notion of differential privacy, formalizing that the output distribution does not differ much between a certain data set and any "neighboring" dataset.

Definition 1 Let $\mathcal{A}$ be a randomized algorithm taking as input a dataset and let $\varepsilon \geq 0$ and $\delta \in (0,1)$ be given parameters. Then, $\mathcal{A}$ is said to be $(\varepsilon, \delta)$-differentially private if for all neighboring datasets $D_1$ and $D_2$ and for all subsets S of the image of $\mathcal{A}$, it is the case that $Pr[\mathcal{A}(D_1) \in S] \leq e^\varepsilon \cdot Pr[\mathcal{A}(D_2) \in S] + \delta$, where the probability is over the randomness used by the algorithm $\mathcal{A}$.

We consider two notions of "neighboring dataset": 1) That the input of a single user is changed, but all other inputs are the same, and 2) That the sum of user inputs is preserved. In the latter case we consider the sum after rounding to the nearest lower multiple of $1/k$, for a large integer parameter $k$, i.e., $(x_1, \ldots, x_n) \in [0,1]^n$ is a neighbor of $(x'_1, \ldots, x'_n) \in [0,1]^n$ if and only if $\Sigma_i x'_i k = \Sigma_i x'_i k$. (Alternatively, just assume that the input is discretized such that $x_i k$ is integer.)

In the shuffled model, the algorithm that we want to show differentially private is the composition of the shuffler and the encoder algorithm run on user inputs. In contrast to the local model of differential privacy, the outputs of encoders do not need to be differentially private. We refer to [5] for details.

Common Lemmas

Let $\mathcal{Y} = \{0, \ldots, N-1\}$, and consider some indexed multiset $E = \{y_1, \ldots, y_{2m}\} \subseteq \mathcal{Y}$ that can possibly be obtained as the union of the outputs of two encoders. Further, let $\mathcal{J}$ denote the collection of subsets of $\{1, \ldots, 2m\}$ of size $m$. For each $I \in \mathcal{J}$ define $X_I(E) = \Sigma_{i \in I} y_i \bmod N$. We will be interested in the following property of a given (fixed) multiset E:

Definition 2 A multiset $E = \{y_1, \ldots, y_{2m}\}$ is $\gamma$-smooth if the distribution of values $X_I(E)$ for $I \in \mathcal{J}$ is close to uniform in the sense that $$Pr_{I \in \mathcal{J}}[X_I(E) = x] \in \left[\frac{1-\gamma}{N}, \frac{1+\gamma}{N}\right]$$

for every $x \in \mathcal{Y}$.

We name the collection of multisets that are $\gamma$-smooth and contain $2m$ distinct elements:

Given $x_1, x_2 \in [0,1]$ such that $x_1 k$ and $x_2 k$ are integers, consider the multisets $E_{N,k,m}(x_1) = \{y_1, \ldots, y_m\}$ and $E_{N,k,m}(x_2) = \{y_{m+1}, \ldots, y_{2m}\}$, and let $E(x_1, x_2) = \{y_1, \ldots, y_{2m}\}$ be their multiset union. The multiset $E(x_1, x_2)$ is a random variable due to the random choices made by the encoder algorithm.

Lemma 1 For every $m \geq 4$, $\gamma > 6\sqrt{m}/2^{2m}$ and for every choice of $x_1, x_2 \in \mathcal{Y}$ we have $$Pr\left[E(x_1, x_2) \notin \binom{\mathcal{Y}}{2m}_{\gamma-smooth}\right] < \frac{2m^2}{N} + \frac{18\sqrt{m} N^2}{\gamma^2 2^{2m}}.$$

Proof of Lemma 1. We first upper bound the probability that the multiset $E(x_1, x_2)$ has any duplicate elements. For $i \neq j$ consider the event $\varepsilon_{i,j}$ that $y_i = y_j$. Since $m > 2$ we have that every pair of distinct values $y_i$, $y_j$ are uniform in $\mathcal{Y}$ and independent, so $Pr(\varepsilon_{i,j}) = 1/N$. A union bound over all $$\binom{2m}{2} < 2m^2$$

pairs yields an upper bound of $2m^2/N$ on the probability that there is at least one duplicate pair. Second, we bound the probability that $E(x_1, x_2)$ is not $\gamma$-smooth. Let $I_1 = \{1, \ldots, m\}$ and $I_2 = \{m+1, \ldots, 2m\}$. Then by definition of the encoder, $X_{I_1}(E(x_1, x_2)) = x_1$ and $X_{I_2}(E(x_1, x_2)) = x_2$ with probability 1. For each $I \in \mathcal{J} \setminus \{I_1, I_2\}$ we have that $X_I$ is uniformly random in the range $\mathcal{Y}$, over the randomness of the encoder. Furthermore, observe that the random variables $\{X_I(E(x_1, x_2))\}_{I \in \mathcal{J}}$ are pairwise independent. Let $Z_I(x)$ be the indicator random variable that is 1 if and only if $X_I(E(x_1, x_2)) = x$. Let $\mathcal{J}' = \mathcal{J} \setminus \{I_1, I_2\}$. For each $x \in \mathcal{Y}$ and $I \in \mathcal{J}'$ we have $E[Z_I(x)] = 1/|\mathcal{Y}| = 1/N$. The sum $Z(x) = \Sigma_{I \in \mathcal{J}} Z_I(x)$ equals the number of sets in $\mathcal{J}$ such that $X_I(E(x_1, x_2)) = x$. Since $Z_{I_1}(x) = 1_{x_1 = x}$ and $Z_{I_2}(x) = 1_{x_2 = x}$ it will be helpful to disregard these fixed terms in $Z(x)$. Thus we define $Z'(x) = \Sigma_{I \in \mathcal{J}'} Z_I(x)$, which is a sum of $|\mathcal{J}|-2$ pairwise independent terms, each with expectation $E[Z_I(x)] = 1/N$. Define $\mu = E[Z'(x)] = |\mathcal{J}'|/N$. We bound the variance of $Z'(x)$:

$$Var(Z'(x)) = E\left[\left(\sum_{I \in \mathcal{J}'}\left(Z_I(x) - \frac{1}{N}\right)\right)^2\right] = E\left[\sum_{I \in \mathcal{J}'}\left(Z_I(x) - \frac{1}{N}\right)^2\right] < E\left[\sum_{I \in \mathcal{J}'} Z_I(x)\right] = \mu.$$

The second equality uses that $$E\left[\left(Z_{I_1}(x) - \frac{1}{N}\right)\left(Z_{I_2}(x) - \frac{1}{N}\right)\right] = 0 \text{ for } I_1 \neq I_2$$

because it is a product of two independent, zero-mean random variables. The inequality holds because $Z_I(x)$ is an indicator function. By Chebychev's inequality over the random choices in the encoder, for any $\sigma > 0$:

$$Pr[|Z'(x) - \mu| > \sigma\mu] < \frac{\operatorname{Var}(Z'(x))}{(\sigma\mu)^2} < \frac{1}{\sigma^2\mu}. \quad (1)$$

For $m \geq 4$ we can bound $$|\mathcal{J}| - 2 = \binom{2m}{m} - 2$$

as follows:

$$2^{2m-1}/\sqrt{m} < \binom{2m}{m} - 2 < 2^{2m}/\sqrt{m}$$

Using this for upper and lower bounding $\mu$ in (1), and choosing $\sigma = \gamma/3$ we get:

$$Pr\left[|Z'(x) - \mu| > \gamma 2^{2m}/(3N\sqrt{m})\right] < \frac{18\sqrt{m}N}{\mu^2 2^m}.$$

A union bound over all $x \in \mathcal{Y}$ implies that with probability at least $$1 - \frac{18\sqrt{m}N^2}{\gamma^2 2^{2m}}:$$

$$\forall x \in \mathcal{Y}: |Z'(x) - \mu| \leq \gamma \frac{2^{2m}}{3N\sqrt{m}} \quad (2)$$

Conditioned on (2) we have:

$$\Pr_{i \in \mathcal{J}}[X_I(E(x_1, x_2)) = x] =$$

$$Z(x)/|\mathcal{J}| \leq (Z'(x) + 2)/|\mathcal{J}| \leq \frac{\mu + 2 + \gamma 2^{2m}/(2N\sqrt{m})}{|\mathcal{J}|} \leq$$

$$\frac{1}{N} + \frac{2 + \gamma 2^{2m}/(3N\sqrt{m})}{2^{2m-1}/\sqrt{m}} = \frac{1 + \frac{\sqrt{m}}{2^{2m-1}} + 2\gamma/3}{N} \leq \frac{1+\gamma}{N}.$$

The final inequality uses the assumption that $\gamma > 6\sqrt{m}/2^{2m}$. A similar computation shows that conditioned on (2), $$Pr_{i \in \mathcal{J}}[X_I, (E(x_1, x_2)) = x] \geq \frac{1-\gamma}{N}.$$

Corollary 1 For $m \geq 4$, and $m = 3\lceil \log N \rceil$, $$Pr\left[E(x_1, x_2) \notin \binom{\mathcal{Y}}{2m}_{N^{-1}-smooth}\right] < \frac{19\lceil \log N \rceil^2}{N}.$$

Proof. We invoke Lemma 1 with $\gamma = N^{-1}$ and $m = 3 \log N$. The probability bound is $$\frac{18\lceil \log N \rceil^2}{N} + \frac{18\sqrt{3\lceil \log N \rceil} N^2}{N^{-2} 2^{6\lceil \log N \rceil}} < \frac{18\lceil \log N \rceil^2}{N} + \frac{18\lceil \log N \rceil}{N^2}.$$

Because $\log N \geq 3$ and $N \geq 6$ this shows the stated bound.

Denote by $\overline{E}(x_1, x_2; y_1, \ldots, y_{m-1}, y_{m+1}, \ldots, y_{2m})$ the sequence obtained by the deterministic encoding for given values $y_1, \ldots, y_{m-1}, y_{m+1}, \ldots, y_{2m} \in \mathcal{Y}$ in Algorithm. Moreover, we denote by $\overline{E}(x_1, x_2, y_1, \ldots, y_{m-1}, y_{m+1}, \ldots, y_{2m})$ the corresponding multiset.

Lemma 2 For any $y^*$ $$\in \binom{\mathcal{Y}}{2m}$$

and for any $x_1$ and $x_2$, it is the case that $$Pr[E(x_1, x_2) = y^*] =$$

$$\frac{1}{|\mathcal{Y}|^{2(m-1)}} \cdot \sum_{\pi \in S_{2m}} 1_{\overline{E}(x_1, x_2; \pi(y^*)_1, \ldots, \pi(y^*)_{m-1}, \pi(y^*)_{m+1}, \ldots, \pi(y^*)_{2m}) = \pi(y^*)}.$$

Proof of Lemma 2. Using the fact that all the elements in $y^*$ are distinct, we have that $$Pr[E(x_1, x_2) = y^*] =$$

$$\sum_{\substack{y_1, \ldots, y_{m-1}, \\ y_{m+1}, \ldots, y_{2m} \in \mathcal{Y}}} \frac{1}{|\mathcal{Y}|^{2(m-1)}} \cdot 1_{\overline{E}(x_1, x_2; y_1, \ldots, y_{m-1}, y_{m+1}, \ldots, y_{2m}) = y^*} =$$

$$\frac{1}{|\mathcal{Y}|^{2(m-1)}} \cdot \sum_{\substack{\text{distinct } y_1, \ldots, y_{m-1} \\ y_{m+1}, \ldots, y_{2m} \in \mathcal{Y}}} 1_{\overline{E}(x_1, x_2; y_1, \ldots, y_{m-1}, y_{m+1}, \ldots, y_{2m}) = y^*} =$$

$$\frac{1}{|\mathcal{Y}|^{2(m-1)}} \cdot \sum_{\substack{\text{distinct } y_1, \ldots, y_{m-1} \\ y_{m+1}, \ldots, y_{2m} \in \mathcal{Y}}} \sum_{\pi \in S_{2m}} 1_{\overline{E}(x_1, x_2; y_1, \ldots, y_{m-1}, y_{m+1}, \ldots, y_{2m}) = \pi(y^*)} =$$

$$\frac{1}{|\mathcal{Y}|^{2(m-1)}} \cdot \sum_{\pi \in S_{2m}} \sum_{\substack{\text{distinct } y_1, \ldots, y_{m-1} \\ y_{m+1}, \ldots, y_{2m} \in \mathcal{Y}}} 1_{\overline{E}(x_1, x_2; y_1, \ldots, y_{m-1}, y_{m+1}, \ldots, y_{2m}) = \pi(y^*)} =$$

$$\frac{1}{|\mathcal{Y}|^{2(m-1)}} \cdot \sum_{\pi \in S_{2m}} 1_{\overline{E}(x_1, x_2; \pi(y^*)_1, \ldots, \pi(y^*)_{m-1}, \pi(y^*)_{m+1}, \ldots, \pi(y^*)_{2m}) = \pi(y^*)}$$

Example Analysis of Privacy Under Sum-Preserving Changes

Lemma 3 For any $y^*$ $$\in \binom{\mathcal{Y}}{2m}_{\gamma-\text{smooth}}$$

and for all $x_1, x_2, x'_1, x'_2$ that are integer multiples of $1/k$ and that satisfy $x_1 + x_2 = x'_1 + x'_2$, it is that case that $$Pr[E(x_1, x_2) = y^*] \leq \frac{1+\gamma}{1-\gamma}.$$

$Pr[E(x'_1, x'_2) = y^*]$.

Proof of Lemma 3. We denote by $\Sigma_i y_i^* := \Sigma_{i \in [2m]} y_i^*$ the sum of all elements in the set $y^*$. We define $B_{y^*,x_1}$:=Numberofsubsetsof$\{1, \ldots, 2m\}$ofsizemforwhich $$\sum_{i \in S} y_i^* = x_1 k \bmod N. \tag{3}$$

We similarly define $B_{y^*,x'_1}$ by replacing $x_1$ in (3) by $x'_1$. Since $y^*$ $$\in \binom{\mathcal{Y}}{2m},$$

Lemma 2 implies that $$Pr[E(x_1, x_2) = y^*] = \tag{4}$$

$$\frac{1}{|\mathcal{Y}|^{2(m-1)}} \cdot \sum_{\pi \in S_{2m}} 1_{E(x_1,x_2;\pi(y^*)_1,\ldots,\pi(y^*)_{m-1},\pi(y)_{m+1},\ldots,\pi(y^*)_{2m})=\pi(y^*)} =$$

$$\frac{(m!)^2}{|\mathcal{Y}|^{2(m-1)}} \cdot B_{y^*,x_1} \cdot 1_{\Sigma_i y_i^* = x_1 k + x_2 k}.$$

Similarly, we love that $$Pr[E(x'_1, x'_2) = y^*] = \frac{(m!)^2}{|\mathcal{Y}|^{2(m-1)}} \cdot B_{y^*,x'_1} \cdot 1_{\Sigma_i y_i^* = x'_1 k + x'_2 k}. \tag{5}$$

Since $y^*$ is $\gamma$-smooth, Definition 2 implies that $$\frac{B_{y^*,x_1}}{B_{y^*,x'_1}} \leq \frac{1+\gamma}{1-\gamma}. \tag{6}$$

By Equations (46) and (5) and the assumption that $x_1+x_2=x'_1+x'_2$ (as well as the assumption that $x_1, x_2, x'_1, x'_2$ are all integer multiples of $1/k$), we get that for every $\gamma$-smooth $y^*$ whose sum is not equal to $x_1+x_2k$, it is the case that $$Pr[E(x_1,x_2)=y^*]=Pr[E(x'_1,x'_2)=y^*]=0, \tag{7}$$

and for every $\gamma$-smooth $y^*$ whose sum is equal to $x_1+x_2k$, the ratio of Equations (46) and (5) along with (6) give that $$Pr[E(x_1, x_2) = y^*] \leq \frac{1+\gamma}{1-\gamma} \cdot Pr[E(x'_1, x'_2) = y^*]. \tag{8}$$

Lemma 4 Suppose $x_1, x_2, \ldots, x_n \in R$ and $x_1, x_2, \ldots, x_n, \in R$ that are integer multiples of $1/k$ satisfying $x_i = x_i$, for all $i \neq j_1, j_2$, where $1 \leq j_1 \neq j_2 \leq n$. Moreover, suppose that for any set $T$ consisting of multisets of $2m$ elements from $\mathcal{Y}$, we have the following guarantee:

$$Pr[E(x_{j_1},x_{j_2}) \in T] \leq e^\varepsilon \cdot Pr[E(x'_{j_1},x'_{j_2}) \in T] + \delta \tag{9}$$

that $Pr[E(x_{j_1}, x_{j_2}) \in T] \leq e^\varepsilon \cdot Pr[E(x_{j_1}', x_{j_2}') \in T] + \delta$ for some $\varepsilon, \delta > 0$. Then, it follows that for any set $S$ of multisets consisting of $mn$ elements from $\mathcal{Y}$, $$Pr[E(x_1,x_2,\ldots,x_n) \in S] \leq e^\varepsilon \cdot Pr[E(x_1,x_2,\ldots,x_n) \in S] + \delta.$$

Proof of Lemma 4. Without loss of generality, assume $j_1=1$ and $j_2=2$ (by symmetry). Thus, $x_i=x_i$, for $i=3, \ldots, n$.

For ease of notation, let $x=(x_1, x_2, \ldots, x_n)$ and $x'=(x_{1'}, x_{2'}, \ldots, x_{n'})$. Suppose $S$ is an arbitrary set of multisets of $mn$ elements from $\mathcal{Y}$. For any $A \subset \mathcal{Y}^m$, we let $\mathcal{R}_{S,A}$ denote $$\mathcal{R}_{S,A} = \bigcup_{T \in S}\left(T \setminus \bigcup_{a \in A}\{a_1, a_2, \ldots, a_m\}\right).$$

Then, we observe that $$Pr[E(x) \in S] =$$

$$\sum_{y_3,\ldots,y_n \in \mathcal{Y}^m} Pr[E(x) \in S \mid \forall i > 2, E(x_i) = y_i] \cdot \prod_{j=3}^n Pr[E(x_j) = y_j] =$$

$$\sum_{y_3,\ldots,y_n} Pr[E(x_1, x_2) \in \mathcal{R}_{S,\{y_3,y_4,\ldots,y_n\}}] \cdot \prod_{j=3}^n Pr[E(x_j) = y_j] =$$

$$\sum_{y_3,\ldots,y_n} \left(e^\varepsilon \cdot Pr[E(x_{1'}, x_{2'}) \in \mathcal{R}_{S,\{y_3,y_4,\ldots,y_n\}}] + \delta\right) \cdot \prod_{j=3}^n Pr[E(x_{j'}) = y_j] \leq e^\varepsilon \cdot$$

$$Pr[E(x') \in S] + \delta \cdot \sum_{y_3,\ldots,y_n \in \mathcal{Y}} \left(\prod_{j=3}^n Pr[E(x_{j'}) = y_j]\right) \leq e^\varepsilon \cdot Pr[E(x') \in S] + \delta,$$

where (10) follows from (9) and the fact that $x_i=x_i$, for $i=3,4, \ldots, n$. This completes the proof.

Lemma 5 Suppose $x_1, x_2, \ldots, x_n \in R$ and $x_{1'}, x_{2'}, \ldots, x_n, \in R$ such that $x_{j_1}+x_{j_2}=x_{j_1}'+x_{j_2}'$ (each of these being an integer multiple of $1/k$) and $x_i=x_i$, for all $i \neq j_1, j_2$, where $1 \leq j_1 \neq j_2 \leq n$. Then, for any set $S$ of multisets consisting of $mn$ elements from $\mathcal{Y}$, we have $$Pr[E(x_1, x_2, \ldots, x_n) \in S] \leq \frac{1+\gamma}{1-\gamma}.$$

$Pr[E(x_{1'}, x_{2'}, \ldots, x_{n'}) \in S] + \eta$, where $$\eta = \frac{2m^2}{N} + \frac{18\sqrt{m}N^2}{\gamma^2 2^{2m}} \text{ and } \gamma > \frac{6\sqrt{m}}{2^{2m}}.$$

Proof of Lemma 5. Without loss of generality, let $j_1=1$ and $j_2=2$. We now consider any set $T$ of multisets of $2m$ elements from $\mathcal{Y}$. Observe that $$Pr[E(x_1, x_2) \in T] \leq \tag{11}$$

$$Pr\left[E(x_1, x_2) \notin \binom{\mathcal{Y}}{2m}_{\gamma-smooth}\right] + Pr\left[E(x_1, x_2) \in T \cap \binom{\mathcal{Y}}{2m}_{\gamma-smooth}\right] \leq$$

$$\eta + \sum_{A \in T \cap \binom{\mathcal{Y}}{2m}_{\gamma-smooth}} Pr[E(x_1, x_2) = A]$$

$$\leq \eta + \sum_{A \in T \cap \binom{\mathcal{Y}}{2m}_{\gamma-smooth}} \frac{1+\gamma}{1-\gamma} \cdot Pr[E(x_{1'}, x_{2'}) = A] \leq \tag{12}$$

$$\eta + \frac{1+\gamma}{1-\gamma} \cdot Pr[E(x_{1'}, x_{2'}) \in T],$$

where (11) and (12) follow from Lemma 1 and Lemma 3, respectively. The desired result now follows from a direct application of Lemma 4.

Using Lemma 5 as a building block for analyzing differential privacy guarantees in the context of sum-preserving swaps, we can derive a differential privacy result with respect to general sum-preserving changes.

Lemma 6 Suppose $x=(x_1, x_2, \ldots, x_n)$ and $x'=(x_{1'}, x_{2'}, \ldots, x_{n'})$ have coordinates that are integer multiples of $1/k$ satisfying $x_1+x_2+\ldots+x_n=x_{1'}+x_{2'}+\ldots+x_{n'}$, and $x'$ can be obtained from $x$ by a series of $t$ sum-preserving swaps. Then, for any $S$, we have $$Pr[E(x_{1'}, x_{2'}, \ldots, x_{n'}) \in S] \le \beta^t Pr[E(x_1, x_2, \ldots, x_n) \in S] + \eta \cdot \frac{\beta^t - 1}{\beta - 1},$$

where $\eta = \frac{2m^2}{N} + \frac{18\sqrt{m} N^2}{\gamma^2 2^{2m}}, \gamma > \frac{6\sqrt{m}}{2^{2m}},$ and $\beta = \frac{1+\gamma}{1-\gamma}$.

Proof of Lemma 6. We prove the lemma by induction on $t$. Note that the case $t=1$ holds by Lemma 5. Now, for the inductive step, suppose the lemma holds for $t=r$. We wish to show that it also holds for $t=r+1$. Note that there exists some $x'' \in \mathcal{Y}^n$ such that (1) $x''$ can be obtained from $x$ by a series of $r$ sum-preserving swaps and (2) $x'$ can be obtained from $x''$ by a single sum-preserving swap. By the inductive hypothesis, we have that $$Pr[E(x_1'' x_2'', \ldots, x_n'') \in S] \le \qquad (13)$$
$$\beta^r Pr[E(x_1, x_2, \ldots, x_n) \in S] + \eta \cdot \frac{\beta^r - 1}{\beta - 1}.$$

Moreover, by Lemma 4, we have that $$Pr[E(x_1, x_2, \ldots, x_{n'}) \in S] \le \beta Pr[E(x_{1''}, x_{2''}, \ldots, x_{n''}) \in S] + \eta. \qquad (14)$$

Combining (13) and (14), we note that $$Pr[E(x_{1'}, x_{2'}, \ldots, x_{n'}) \in S] \le \beta \left( \beta^r Pr[E(x_1, x_2, \ldots, x_n) \in S] \cdot \frac{\beta^r - 1}{\beta - 1} \right) +$$
$$\eta \le \beta^{r+1} Pr[E(x_1, x_2, \ldots, x_n) \in S] + \eta \cdot \frac{\beta^{r+1} - 1}{\beta - 1},$$

which establishes the claim for $t=r+1$.

As a consequence, we obtain the following main theorem establishing differential privacy of Algorithm 1 with respect to sum-preserving changes in the shuffled model: We are now ready to prove Theorem 2.

Proof of Theorem 2. In Algorithm 1, each user communicates at most $O(m \log N)$ bits which are sent via m messages. Note that if $x=(x_1, \ldots, x_n)$ and $x'=(x_{1'}, \ldots, x_{n'})$ have coordinates that are integer multiples of $1/k$ satisfying $x_1+\ldots+x_n=x_{1'}+\ldots+x_{n'}$, then there is a sequence of $t \le n-1$ sum-preserving swaps that allows us to transform $x$ into $x'$. Thus, Lemma 6 implies that Algorithm 1 is $(\varepsilon, \delta)$-differentially private with respect to sum-preserving changes if $$\frac{(1+\gamma)^{n-1}}{(1-\gamma)^{n-1}} \le e^\varepsilon, \text{ and } \frac{2m^2}{N} + \frac{18\sqrt{m} N^2}{\gamma^2 2^{2m}} \le \delta,$$

for any $$\gamma > \frac{6\sqrt{m}}{2^{2m}} \text{ and } m \ge 4.$$

The error in our final estimate (which is due to rounding) is $O(n/k)$ in the worst case. The theorem now follows by choosing $$m > 10 \log\left(\frac{nk}{\varepsilon\delta}\right), \gamma = \frac{\varepsilon}{10n}, k = 10n$$

and N being the first odd integer larger than $$3kn + \frac{10}{\delta} + \frac{10}{\varepsilon}.$$

Example Analysis of Privacy Under Single-User Changes

One example idea is to run Algorithm 1 after having each player add some noise to her input, with some fixed probability independently from the other players. The noise distribution can satisfy three properties: it should be supported on a finite interval, the logarithm of its probability mass function should have a small Lipschitz-constant (even under modular arithmetic) and its variance should be small. The following truncated version of the discrete Laplace distribution satisfies all three properties.

Definition 3 (Truncated Discrete Laplace Distribution) Let N be a positive odd integer and $p \in (0,1)$. The probability mass function of the truncated discrete Laplace distribution $\mathcal{D}_{N,p}$ is defined by $$D_{N,p}[k] = \frac{(1-p) \cdot p^{|k|}}{1 + p - 2p^{\frac{N+1}{2}}} \qquad (15)$$

for every integer k in the range $$\left\{ -\frac{(N-1)}{2}, \ldots, +\frac{(N-1)}{2} \right\}.$$

Lemma 7 (Log-Lipschitzness) Let N be a positive odd integer and $p \in (0,1)$ a real number. Define the interval $$I = \left\{ -\frac{(N-1)}{2}, \ldots, +\frac{(N-1)}{2} \right\}.$$

For all $k \in \{0, \ldots, N-1\}$ and all $t \in I$, it is the case that $$p^{|t|} \le \frac{D_{N,p}[(k+t) \bmod I]}{D_{N,p}[k \bmod I]} \le p^{-|t|}.$$

Proof of Lemma 7. We start by noting that (15) implies that $$\frac{D_{N,p}[(k+t) \bmod I]}{D_{N,p}[k \bmod I]} = \frac{p^{|(k+t) \bmod I|}}{p^{|k \bmod I|}}. \quad (16)$$

We distinguish six cases depending on the values of k and k+t:

$$\text{Case 1: } 0 \le k \le \frac{N-1}{2} \text{ and } -\frac{(N-1)}{2} \le k+t \le -1. \quad (17)$$

$$\text{Case 2: } 0 \le k \le \frac{N-1}{2} \text{ and } 0 \le k+t \le \frac{N-1}{2}. \quad (18)$$

$$\text{Case 3: } 0 \le k \le \frac{N-1}{2} \text{ and } \frac{N+1}{2} \le k+t \le N-1. \quad (19)$$

$$\text{Case 4: } \frac{N+1}{2} \le k \le N-1 \text{ and } 1 \le k+t \le \frac{N-1}{2}. \quad (20)$$

$$\text{Case 5: } \frac{N+1}{2} \le k \le N-1 \text{ and } \frac{N+1}{2} \le k+t \le N-1. \quad (21)$$

$$\text{Case 6: } \frac{N+1}{2} \le k \le N-1 \text{ and } N \le k+t \le N-1+\frac{N-1}{2}. \quad (22)$$

In Cases 1, 2 and 3, we have that $$0 \le k \le \frac{N-1}{2}$$

which implies that $|k \bmod I| = k$ and hence the denominator in (16) satisfies $$p^{|k \bmod I|} = p^k. \quad (23)$$

Plugging (23) in (16), we get $$\frac{D_{N,p}[(k+t) \bmod I]}{D_{N,p}[k \bmod I]} = \frac{p^{|(k+t) \bmod I|}}{p^k}. \quad (24)$$

We now separately examine each of these three cases.

Case 1.

If (17) holds, then $|(k+t) \bmod I| = -k-t$ and the numerator in (24) becomes $$p^{|(k+t) \bmod I|} = p^{-k-t}. \quad (25)$$

Plugging (25) in (24), we get $$\frac{D_{N,p}[(k+t) \bmod I]}{D_{N,p}[k \bmod I]} = p^{-2k-t}. \quad (26)$$

Using the facts that k+t<0 and k≥0, and thus that t<0, we get that the quantity in (26) is at most $p^{-|t|}$ and at least $p^{|t|}$.

Case 2.

If (18) holds, then $|(k+t) \bmod I| = k+t$ and the numerator in (24) becomes $$p^{|(k+t) \bmod I|} = p^{k+t}. \quad (27)$$

Plugging (27) in (24), we get $$\frac{D_{N,p}[(k+t) \bmod I]}{D_{N,p}[k \bmod I]} = p^t.$$

Case 3.

If (19) holds, then $|(k+t) \bmod I| = N-k-t$ and the numerator in (24) becomes $$p^{|(k+t) \bmod I|} = p^{N-k-t}. \quad (28)$$

Plugging (28) in (24), we get $$\frac{D_{N,p}[(k+t) \bmod I]}{D_{N,p}[k \bmod I]} = p^{N-2k-t}. \quad (29)$$

Using the fact that $$k+t \ge \frac{N+1}{2}$$

which, along with the fact that $$k \le \frac{N-1}{2},$$

implies that t>0, we get that the quantity in (29) is at most $p^{-|t|}$ and at least $p^{|t|}$.

We now turn to Cases 4, 5 and 6. In these, $$\frac{N+1}{2} \le k \le N-1,$$

which implies that $|k \bmod I| = N-k$ and hence the denominator in (16) satisfies $$p^{|k \bmod I|} = p^{N-k}. \quad (30)$$

Plugging (30) in (16), we get $$\frac{D_{N,p}[(k+t) \bmod I]}{D_{N,p}[k \bmod I]} = \frac{p^{|(k+t) \bmod I|}}{p^{N-k}}. \quad (31)$$

We now separately examine each of these three cases.

Case 4.

If (20) holds, then $|(k+t) \bmod I| = k+t$ and the numerator in (31) becomes $$p^{|(k+t) \bmod I|} = p^{k+t}. \quad (32)$$

Plugging (32) in (31), we get $$\frac{D_{N,p}[(k+t) \bmod I]}{D_{N,p}[k \bmod I]} = p^{2k+t-N}. \quad (33)$$

Using the facts that $$k+t \le \frac{N-1}{2} \text{ and } k \ge \frac{N+1}{2},$$

we deduce that t<0 and that the quantity in (33) is at most $p^{-|t|}$ and at least $p^{|t|}$.

Case 5.

If (21) holds, then $|(k+t) \bmod I| = N-k-t$ and the numerator in (31) becomes $$p^{|(k+t) \bmod I|} = p^{N-k-t}. \quad (34)$$

Plugging (34) in (31), we get $$\frac{\mathcal{D}_{N,p}[(k+t) \bmod I]}{\mathcal{D}_{N,p}[k \bmod I]} = p^{-t}.$$

Case 6.
If (22) holds, then $|(k+t) \bmod I| = k+t-N$ and the numerator in (31) becomes $$p^{|(k+t) \bmod I|} = p^{k+t-N}. \quad (35)$$

Plugging (35) (35), we get $$\frac{\mathcal{D}_{N,p}[(k+t) \bmod I]}{\mathcal{D}_{N,p}[k \bmod I]} = p^{2k+t-2N}. \quad (36)$$

Using the facts that $k<N$ and $k+t \geq N$, we get that $t<0$ and that the quantity in (36) is at most $p^{-|t|}$ and at least $p^{|t|}$.

Lemma 8 Let N be a positive odd integer and $p \in (0,1)$ a real number. Let X be a random variable drawn from the truncated discrete Laplace distribution $\mathcal{D}_{N,p}$. Then, the mean and variance of X satisfy $E[X]=0$ and $$\text{Var}[X] \leq \frac{2p(1+p)}{(1-p)^2 \left(1+p-2p^{(N+1)/2}\right)}.$$

In order to prove Lemma 8, we will need the simple fact given in Lemma 9.

Lemma 9 For any $p \in [0,1)$, it is the case that $$\sum_{k=1}^{\infty} k^2 p^k = \frac{p(1+p)}{(1-p)^3}.$$

Proof of Lemma 9. For every $p \in [0,1)$, we consider the geometric series $f(p) := \sum_{k=1}^{\infty} p^k$. Differentiating and multiplying by p, we get $pf'(p) = \sum_{k=1}^{\infty} kp^k$. Differentiating a second time and multiplying by p, we get $$p(pf'(p))' = \sum_{k=1}^{\infty} k^2 p^k. \quad (37)$$

Using the formula for a convergent geometric series, we have $$f(p) = \frac{p}{1-p}.$$

Plugging this expression in (37) and differentiating, we get $$\sum_{k=1}^{\infty} k^2 p^k = \frac{p(1+p)}{(1-p)^3}.$$

Proof of Lemma 8. We have that $$E[X] = \sum_{k=-\frac{N-1}{2}}^{\frac{N-1}{2}} k \cdot \mathcal{D}_{N,p}[k] = \sum_{k=1}^{\frac{N-1}{2}} k \cdot (\mathcal{D}_{N,p}[k] - \mathcal{D}_{N,p}[-k]) = 0, \quad (38)$$

where the last equality follows from the fact that $\mathcal{D}_{N,p}[k] = \mathcal{D}N,p[-k]$ for all $k \in \{1, \ldots, (N-1)/2\}$ (which directly follows from (15)). Using this same property along with (38), we also get that $$\text{Var}[X] = E[X^2] = \sum_{k=-\frac{N-1}{2}}^{\frac{N-1}{2}} k^2 \cdot \mathcal{D}_{N,p}[k] = 2 \cdot \sum_{k=1}^{\frac{N-1}{2}} k^2 \cdot \mathcal{D}_{N,p}[k] \quad (39)$$

Plugging the definition (15) of $\mathcal{D}_{N,p}[k]$ in (39), we get $$\text{Var}[X] = \frac{2(1-p)}{(1+p)\left(1+p-2p^{(N+1)/2}\right)} \sum_{k=1}^{(N-1)/2} k^2 p^k \leq \quad (40)$$

$$\frac{2(1-p)}{(1+p)\left(1+p-2p^{\frac{N+1}{2}}\right)} \sum_{k=1}^{\infty} k^2 p^k.$$

Applying Lemma 9 in (40) and simplifying, we get that $$\text{Var}[X] \leq \frac{2p(1+p)}{(1-p)^2 \left(1+p-2p^{\frac{N+1}{2}}\right)}.$$

The next lemma will be used to show that the proposed algorithm is differentially private with respect to single-user changes.

Lemma 10 Let $w_1, w_2$ be two independent random variable sampled from the truncated discrete Laplace distribution $\mathcal{D}_{N,p}$ where N is any positive odd integer and $p \in (0,1)$ is any real number, and let $$z_1 = \frac{w_1}{k} \text{ and } z_2 = \frac{w_2}{k}.$$

For any $y^*$ $$\in \binom{\mathcal{Y}}{2m}_{\gamma\text{-smooth}}$$

and for all $x_1, x_2, x'_1 \in [0,1)$, if we denote $$\tilde{x}_1 = \frac{\lfloor x_1 k \rfloor}{k}, \tilde{x}_2 = \frac{\lfloor x_2 k \rfloor}{k} \text{ and } \tilde{x}'_1 = \frac{\lfloor x'_1 k \rfloor}{k},$$

then $$Pr[E(\tilde{x}_1, \tilde{x}_2 + z_2) = y^*] \leq \frac{1+\gamma}{1-\gamma} \cdot p^{-k} \cdot Pr[E(\tilde{x}'_1, \tilde{x}_2 + z_2) = y^*], \quad (41)$$

$$Pr[E(\tilde{x}_1 + z_1, \tilde{x}_2) = y^*] \leq \frac{1+\gamma}{1-\gamma} \cdot p^{-k} \cdot Pr[E(\tilde{x}'_1 + z_1, \tilde{x}_2) = y^*]. \quad (42)$$

$$Pr[E(\tilde{x}_1 + z_1, \tilde{x}_2 + z_2) = y^*] \leq \frac{1+\gamma}{1-\gamma} \cdot p^{-k} \cdot Pr[E(\tilde{x}'_1 + z_1, \tilde{x}_2 + z_2) = y^*]. \quad (43)$$

and

Proof of Lemma 10. As in Lemma 7, we define the interval $$I = \left\{ -\frac{(N-1)}{2}, \ldots, +\frac{(N-1)}{2} \right\}.$$

We define $$B_{y^*,x_1} := Number of subsets S of \{1, \ldots, 2m\} of size m for which \sum_{i \in S} y_i^* = \lfloor x_i k \rfloor \bmod N. \quad (44)$$

We similarly define $B_{y^*,x'_1}$ and $B_{y^*,x_2}$ by replacing $x_1$ in (44) by $x'_1$ and $x_2$ respectively.

Proof of Inequality (41).

By Lemma 2, we have that $$Pr[E(\tilde{x}_1, \tilde{x}_2 + z_2) = y^*]$$
$$= \frac{1}{|\mathcal{Y}|^{2(m-1)}} \cdot \sum_{\pi \in S_{2m}} 1_{E(\tilde{x}_1, \tilde{x}_2 + z_2; \pi(y^*)_1, \ldots, \pi(y^*)_{m-1}, \pi(y^*)_{m+1}, \ldots, \pi(y^*)_{2m}) = \pi(y^*)}$$
$$= \frac{(m!)^2}{|\mathcal{Y}|^{2(m-1)}} \cdot B_{y^*,x_1} \cdot \Pr_{z_2 \sim \mathcal{D}_{N,p}}\left[z_2 = \left(\sum_{i \in [2m]} y_i^* - \lfloor x_1 k \rfloor - \lfloor x_2 k \rfloor\right) \bmod N\right] \quad (45)$$
$$= \frac{(m!)^2}{|\mathcal{Y}|^{2(m-1)}} \cdot B_{y^*,x_1} \cdot \mathcal{D}_{N,p}\left[\left(\sum_{i \in [2m]} y_i^* - \lfloor x_1 k \rfloor - \lfloor x_2 k \rfloor\right) \bmod I\right]. \quad (46)$$

By Lemma 2, we also have that $$Pr[E(\tilde{x}'_1, \tilde{x}_2 + z_2) = y^*]$$
$$= \frac{1}{|\mathcal{Y}|^{2(m-1)}} \cdot \sum_{\pi \in S_{2m}} 1_{E(\tilde{x}'_1, \tilde{x}_2 + z_2; \pi(y^*)_1, \ldots, \pi(y^*)_{m-1}, \pi(y^*)_{m+1}, \ldots, \pi(y^*)_{2m}) = \pi(y^*)}$$
$$= \frac{(m!)^2}{|\mathcal{Y}|^{2(m-1)}} \cdot B_{y^*,x'_1} \cdot \Pr_{z_2 \sim \mathcal{D}_{N,p}}\left[z_2 = \left(\sum_{i \in [2m]} y_i^* - \lfloor x'_1 k \rfloor - \lfloor x_2 k \rfloor\right) \bmod N\right]$$
$$= \frac{(m!)^2}{|\mathcal{Y}|^{2(m-1)}} \cdot B_{y^*,x'_1} \cdot \mathcal{D}_{N,p}\left[\left(\sum_{i \in [2m]} y_i^* - \lfloor x'_1 k \rfloor - \lfloor x_2 k \rfloor\right) \bmod I\right]. \quad (47)$$

Since $y^*$ is $\gamma$-smooth, Definition 2 implies that $$\frac{B_{y^*,x_1}}{B_{y^*,x'_1}} \leq \frac{1+\gamma}{1-\gamma}. \quad (48)$$

Applying Lemma 7 with $k = \sum_{i \in [2m]} y^*_i - \lfloor x'_1 k \rfloor - \lfloor x_2 k \rfloor$ and $t = \lfloor x'_1 k \rfloor - \lfloor x_1 k \rfloor$ and using the fact that $x_1, x'_1 \in [0,1)$ gives $$\frac{\mathcal{D}_{N,p}\left[\left(\sum_{i \in [2m]} y_i^* - \lfloor x_1 k \rfloor - \lfloor x_2 k \rfloor\right) \bmod I\right]}{\mathcal{D}_{N,p}\left[\left(\sum_{i \in [2m]} y_i^* - \lfloor x'_1 k \rfloor - \lfloor x_2 k \rfloor\right) \bmod I\right]} \leq p^{-|\lfloor x'_1 k \rfloor - \lfloor x_1 k \rfloor|} \leq p^{-k}. \quad (49)$$

Dividing (46) by (47) and using (48) and (49), we get Inequality (41).

Proof of Inequality (42).

We note that similarly to (47) we have $$Pr[E(\tilde{x}_1 + z_1, \tilde{x}_2 = y^*] = \quad (50)$$
$$\frac{(m!)^2}{|\mathcal{Y}|^{2(m-1)}} \cdot |B_{x_2}| \cdot \mathcal{D}_{N,p}\left[\left(\sum_{i \in [2m]} y_i^* - \lfloor x_1 k \rfloor - \lfloor x_2 k \rfloor\right) \bmod I\right],$$

and $$Pr[E(\tilde{x}'_1 + z_1, \tilde{x}_2 = y^*] = \quad (51)$$
$$\frac{(m!)^2}{|\mathcal{Y}|^{2(m-1)}} \cdot |B_{x_2}| \cdot \mathcal{D}_{N,p}\left[\left(\sum_{i \in [2m]} y_i^* - \lfloor x'_1 k \rfloor - \lfloor x_2 k \rfloor\right) \bmod I\right],$$

Dividing (50) by (51) and using (49), we get Inequality (42).

Proof of Inequality (43).

By averaging over $z_2$ and applying Inequality (42) with $\tilde{x}_2$ replaced by $\tilde{x}_2 + z_2$ (for every fixed setting of $z_2$), we get Inequality (43).

Lemma 11 Let N be a positive odd integer and $p \in (0,1)$ and $q \in (0,1]$ be real numbers. Let $b_1, \ldots, b_n$ be iid random variables that are equal to 1 with probability q and to 0 otherwise, let $w_1, \ldots, w_n$ be iid random variables that are drawn from the truncated discrete Laplace distribution $\mathcal{D}_{N,p}$ independently of $b_1, \ldots, b_n$, and let $$z_i = \frac{b_i w_i}{k}$$

for all $i \in [n]$. Then, for all $j \in [n]$, all $x_1, \ldots, x_j, \ldots, x_n$, $x'_j \in [0,1)$, if we donate $$\tilde{x}_i = \frac{\lfloor x_i k \rfloor}{k}$$

for all $i \in [n]$ and $$\tilde{x}'_j = \frac{\lfloor x'_j k \rfloor}{k},$$

then for all S, the following inequality holds $$Pr[E(\tilde{x}_1 + z_1, \ldots, \tilde{x}_j + z_j, \ldots, \tilde{x}_n + z_n) \in S] \leq \frac{1+\gamma}{1-\gamma} \cdot \frac{p^{-k}}{1-e^{-qn}} \cdot \quad (52)$$
$$Pr[E(\tilde{x}_1 + z_1, \ldots, \tilde{x}'_j + z_j, \ldots, \tilde{x}_n + z_n) \in S] + \eta + e^{-qn},$$

for any $$\gamma > \frac{6\sqrt{m}}{2^{2m}}, m \geq 4 \text{ and } \eta = \frac{2m^2}{N} + \frac{18\sqrt{m} N^2}{\gamma^2 2^{2m}},$$

and where the probabilities in (52) are over $z_1, \ldots, z_n$ and the internal randomness of $E(\cdot)$.

Proof of Lemma 11. Let A denote the event that there exists at least one $i \in [n]$ for which $b_i = 1$. Then, $$Pr[A] = 1 - (1-q)^n \geq 1 - e^{-qn}, \quad (53)$$

where the last inequality follows from the fact that $e^t \geq 1+t$ for any real number t. To prove (52), it suffices to show a similar inequality conditioned on the event A, i.e., $$Pr[E(\tilde{x}_1 + z_1, \ldots, \tilde{x}_j + z_j, \ldots, \tilde{x}_n + z_n) \in S|A] \leq \quad (54)$$

$$\frac{1+\gamma}{1-\gamma} \cdot p^{-k} \cdot Pr\left[E(\tilde{x}_1 + z_1, \ldots, \tilde{x}'_j + z_j, \ldots, \tilde{x}_n + z_n) \in S|A\right] + \eta.$$

To see this, denote by $\overline{A}$ the complement of the event A and assume that (54) holds. Then, $$Pr[E(\tilde{x}_1 + z_1, \ldots, \tilde{x}_j + z_j, \ldots, \tilde{x}_n + z_n) \in S]$$

$$= Pr[A] \cdot Pr[E(\tilde{x}_1 + z_1, \ldots, \tilde{x}_j + z_j, \ldots, \tilde{x}_n + z_n) \in S|A]$$

$$+ Pr[\overline{A}] \cdot Pr[E(\tilde{x}_1 + z_1, \ldots, \tilde{x}_j + z_j, \ldots, \tilde{x}_n + z_n) \in S|\overline{A}]$$

$$\leq Pr[E(\tilde{x}_1 + z_1, \ldots, \tilde{x}_j + z_j, \ldots, \tilde{x}_n + z_n) \in S|A] + e^{-qn} \quad (55)$$

$$\leq \frac{1+\gamma}{1-\gamma} \cdot p^{-k} \cdot \quad (56)$$

$$Pr\left[E(\tilde{x}_1 + z_1, \ldots, \tilde{x}'_j + z_j, \ldots, \tilde{x}_n + z_n) \in S|A\right] + \eta + e^{-qn}$$

$$\leq \frac{1+\gamma}{1-\gamma} \cdot p^{-k} \cdot \frac{Pr\left[E(\tilde{x}_1 + z_1, \ldots, \tilde{x}'_j + z_j, \ldots, \tilde{x}_n + z_n) \in S\right]}{Pr[A]} + \eta + e^{-qn}$$

$$\leq \frac{1+\gamma}{1-\gamma} \cdot \frac{p^{-k}}{1-e^{-qn}} \cdot \quad (57)$$

$$Pr\left[E(\tilde{x}_1 + z_1, \ldots, \tilde{x}'_j + z_j, \ldots, \tilde{x}_n + z_n) \in S\right] + \eta + e^{-qn},$$

where (55) and (57) follow from (53), and where (56) follows from the assumption that (54) holds. We thus turn to the proof of (54). Note that it suffices to prove this inequality for any fixed setting of $b_1, \ldots, b_n$ satisfying the event A, i.e., $$Pr[E(\tilde{x}_1 + z_1, \ldots, \tilde{x}_j + z_j, \ldots, \tilde{x}_n + z_n) \in S|b_1, \ldots, b_n] \leq \frac{1+\gamma}{1-\gamma} \cdot \quad (58)$$

$$p^{-k} \cdot Pr\left[E(\tilde{x}_1 + z_1, \ldots, \tilde{x}'_j + z_j, \ldots, \tilde{x}_n + z_n) \in S|b_1, \ldots, b_n\right] + \eta,$$

and (54) would follows from (58) by averaging. Henceforth, we fix a setting of $b_1, \ldots, b_n$ satisfying the event A. Without loss of generality, we assume that j=1. If $b_j$=0, then the event A implies that there exists $j_2 \neq j$ such that $b_{j_2}$=1. Without loss of generality, we assume that $j_2$=2. In order to show (58) for this setting of $b_1, \ldots, b_n$, it suffices to show the same inequality where we also condition on any setting of $w_3, \ldots, w_n$, i.e., $$Pr[E(\tilde{x}_1 + z_1, \ldots, \tilde{x}_j + z_j, \ldots, \tilde{x}_n + z_n) \in S \mid b_1, \ldots, b_n, w_3, \ldots, \quad (59)$$

$$w_n] \leq \frac{1+\gamma}{1-\gamma} \cdot p^{-k} \cdot Pr\left[E(\tilde{x}_1 + z_1, \ldots, \tilde{x}'_j + z_j, \ldots, \tilde{x}_n + z_n) \in\right.$$

$$\left. S \mid b_1, \ldots, b_n, w_3, \ldots, w_n\right] + \eta,$$

Applying Lemma 4 with $j_1$=j=1 and $j_2$=2 and with inputs $\tilde{x}'_3 + z_3, \ldots, \tilde{x}'_n + z_n$ for the non-selected players, we get that to prove (59), it suffices to show that for any set T, the following inequality holds $$Pr[E(\tilde{x}_1 + z_1, \tilde{x}_2 + z_2) \in T] \leq \quad (60)$$

$$\frac{1+\gamma}{1-\gamma} \cdot p^{-k} \cdot Pr[E(\tilde{x}'_1 + z_1, \tilde{x}_2 + z_2) \in T] + \eta.$$

We now prove (60):

$$Pr[E(\tilde{x}_1 + z_1, \tilde{x}_2 + z_2) \in T] \leq Pr\left[E(\tilde{x}_1 + z_1, \tilde{x}_2 + z_2) \notin \binom{\mathcal{Y}}{2m}_{\gamma-smooth}\right] + \quad (61)$$

$$Pr\left[E(\tilde{x}_1 + z_1, \tilde{x}_2 + z_2) \in T \cap \binom{\mathcal{Y}}{2m}_{\gamma-smooth}\right] \leq$$

$$\eta + \sum_{A \in T \cap \binom{\mathcal{Y}}{2m}_{\gamma-smooth}} Pr[E(\tilde{x}_1 + z_1, \tilde{x}_2 + z_2) = A]$$

$$\leq \eta + \sum_{A \in T \cap \binom{\mathcal{Y}}{2m}_{\gamma-smooth}} \frac{1+\gamma}{1-\gamma} \cdot p^{-k} \cdot Pr[E(\tilde{x}'_1 + z_1, \tilde{x}_2 + z_2) = A] \leq \quad (62)$$

$$\eta + \frac{1+\gamma}{1-\gamma} \cdot p^{-k} \cdot Pr[E(\tilde{x}'_1 + z_1, \tilde{x}_2 + z_2) \in T],$$

with $$\eta = \frac{2m^2}{N} + \frac{18\sqrt{m}N^2}{\gamma^2 2^{2m}}$$

and where (61) follows by averaging over all settings of $z_1$, $z_2$ and invoking Lemma 1, and (62) follows from Lemma 10 and the fact that at least one of $b_1$, $b_2$ is equal to 1.

As a consequence, we obtain the following main theorem establishing differential privacy of Algorithm 1 with respect to single-user changes in the shuffled model: We are now ready to prove Theorem 1.1.

Proof of Theorem 1. In Algorithm 1, each user communicates at most O(mlogN) bits which are sent via m messages. By Lemma 11, Algorithm 1 is (ε, δ)-differentially private with respect to single-user changes if $$\frac{1+\gamma}{1-\gamma} \cdot \frac{p^{-k}}{1-e^{-qn}} \leq e^\varepsilon, \text{ and } \frac{2m^2}{N} + \frac{18\sqrt{m}N^2}{\gamma^2 2^{2m}} + e^{-qn} \leq \delta,$$

for any $$\gamma > \frac{6\sqrt{m}}{2^{2m}} \text{ and } m \geq 4.$$

The error in our final estimate consists of two parts: the rounding error which is O(n/k) in the worst case, and the error due to the added folded Discrete Laplace noise whose average absolute value is at most $$O\left(\frac{\sqrt{qn}}{1-p}\right)$$

(this follows from Lemma 8 along with the facts that the variance is additive for independent random variables, and that for any zero-mean random variable X, it is the case that $E[|X|] \leq \sqrt{Var[X]}$). The theorem now follows by choosing $$p = 1 - \frac{\varepsilon}{10k}, q = 10\frac{\log(1/\delta)}{n}, m = 10\log\left(\frac{nk}{\varepsilon\delta}\right), \gamma = \frac{\varepsilon}{10}, k = 10n$$

and N being the first odd integer larger than $$3kn + \frac{10}{\delta} + \frac{10}{\varepsilon}.$$

Example Resilience Against Colluding Users

This section formalizes the resilience of Algorithm 1 against a very large fraction of the users colluding with the server (thereby revealing their inputs and messages).

Lemma 12 (Resilient privacy under sum-preserving changes) Let $C \subseteq [n]$ denote the subset of colluding users. Then, for all $x_1, \ldots, \ldots, x_i$, and $x'_1, \ldots, \ldots, x'_n$ that are integer multiples of $1/k$ in the interval $[0,1)$ and that satisfy $\Sigma_{j\notin C} x_j = \Sigma_{j\notin C} x'_j$ and $x'_j = x_j$ for all $j \in C$, and for all subsets S, the following inequality holds $$Pr[E(x_1, \ldots, x_n) \in S \mid E(x_i) \forall i \in C] \leq \qquad (63)$$

$$\beta^{n-1} \cdot Pr[E(x'_1, \ldots, x'_n) \in S \mid E(x_i) \forall i \in C] + \frac{(\beta^{n-1} - 1)}{(\beta - 1)} \cdot \eta,$$

for $$\beta = \frac{1+\gamma}{1-\gamma}, \text{ any } \gamma > \frac{6\sqrt{m}}{2^{2m}}, m \geq 4 \text{ and } \eta = \frac{2m^2}{N} + \frac{18\sqrt{m} N^2}{\gamma^2 2^{2m}},$$

and where the probabilities in (63) are over the internal randomness of $E(\cdot)$.

Lemma 13 (Resilient privacy under single-user changes) Let N be a positive odd integer and $p \in (0,1)$ and $q \in (0,1]$ be real numbers. Let $C \subseteq [n]$ denote the subset of colluding users. Let $b_1, \ldots, b_n$ be iid random variables that are equal to 1 with probability q and to 0 otherwise, let $w_1, \ldots, w_n$ be iid random variables that are drawn from the folded discrete Laplace distribution $\mathcal{D}_{N,p}$ independently of $b_1, \ldots, b_n$, and let $$z_i = \frac{b_i w_i}{k}$$

for all $i \in [n]$. If $|C| \leq 0.9n$, then for all $j \notin C$, all $x_1, \ldots, x_j, \ldots, x_n, x'_j \in [0,1)$ and all subsets S, if we denote $$\tilde{x}_i = \frac{\lfloor x_i k \rfloor}{k} \text{ for all } i \in [n] \text{ and } \tilde{x}'_j = \frac{\lfloor x'_j k \rfloor}{k},$$

then $$Pr[E(\tilde{x}_1 + z_1, \ldots, \tilde{x}_j + z_j, \ldots, \tilde{x}_n + z_n) \in S \mid E(\tilde{x}_i + z_i) \forall i \in C] \leq \qquad (64)$$

$$\frac{1+\gamma}{1-\gamma} \cdot \frac{p^{-k}}{1 - e^{-q(n-|C|)}} \cdot Pr[E(\tilde{x}_1 + z_1, \ldots, \tilde{x}'_j + z_j, \ldots, \tilde{x}_n + z_n) \in$$

$$S \mid E(\tilde{x}_i + z_i) \forall i \in C] + \eta + e^{-q(n-|C|)},$$

for any $$\gamma > \frac{6\sqrt{m}}{2^{2m}}, m \geq 4 \text{ and } \eta = \frac{2m^2}{N} + \frac{18\sqrt{m} N^2}{\gamma^2 2^{2m}},$$

and where the probabilities in (64) are over $z_1, \ldots, z_n$ and the internal randomness of $E(\cdot)$.

Proof of Lemma 12. We start by applying Lemma 4 in order to condition on the messages of all the colluding users. This allows us to reduce to the case where the messages of all users in C are fixed and where we would like to prove the differential privacy guarantee with respect to single-user changes on the inputs of the smaller subset $[n]\backslash C$ of (non-colluding) users. The rest of the proof follows along the same lines as the proof of Lemma 6 with any modification in the bounds.

Proof of Lemma 13. We start by applying Lemma 4 in order to condition on the messages of all colluding users. This allows us to reduce to the case where the messages of all users in C are fixed and where we would like to prove differential privacy guarantees with respect to sum-preserving changes on the smaller subset $[n]\backslash C$ of (non-colluding) users. The rest of the proof follows along the same lines as the proof of Lemma 11. Note that that the tail probability term $e^{-qn}$ in (52) is replaced by the slightly larger quantity $e^{-q(n-|C|)}$ in (64) as the event A in the proof of Lemma 11 has now to be defined over the smaller set $[n]\backslash C$ of non-colluding users (and consequently the bounds in (53) and (57) are modified similarly).

Example Devices and Systems

FIG. 1 depicts an example computing system 100 that can be used to implement one example application of the methods and systems of the present disclosure in the federated learning context. Federated learning is provided as one example only, the proposed aggregation techniques can be applied to many other different problems/applications. The system 100 can be implemented using a client-server architecture that includes a server 110 that communicates with one or more client devices 130 and/or a shuffler 150 over a network.

Each client device 130 can include one or more processor(s) 132 and a memory 134. The one or more processor(s) 132 can include, for example, one or more central processing units (CPUs), graphics processing units (GPUs) dedicated to efficiently rendering images or performing other specialized calculations, and/or other processing devices. The memory 134 can include one or more computer-readable media and can store information accessible by the one or more processors 132, including instructions 136 that can be executed by the one or more processors 132 and data 138.

The instructions 136 can include instructions for implementing a local updater configured to determine one or more local updates to a machine-learned model (e.g., a set of values descriptive of changes to the model parameters based on a set of locally stored training data). For example, the local updater can perform one or more training techniques such as, for example, backwards propagation of errors to re-train or otherwise update the model based on the locally stored training data. The local updater can be included in an application or can be included in the operating system of the device 130.

The locally stored data 138 such as the local update can be considered private data. The local update is used only as one example of private data that can be securely aggregated. Any form of private data can be securely aggregated according to the described techniques.

The instructions 136 can further include instructions for implementing an encoder to encode the private data such as the local update. For example, the encoder can perform one or more of the encoding techniques described herein (e.g., the encoding Algorithm 1 shown in FIG. 3). In particular, the encoder can encode the private data (e.g., the local update) into a plurality of messages and the messages can be transmitted to a shuffler 150.

The client device 130 of FIG. 1 can include various input/output devices for providing and receiving information from a user, such as a touch screen, touch pad, data entry keys, speakers, and/or a microphone suitable for voice recognition.

The client device 130 can also include a network interface used to communicate with one or more remote computing devices (e.g. server 110) over the network. The network interface can include any suitable components for interfacing with one more networks, including for example, transmitters, receivers, ports, controllers, antennas, or other suitable components.

The shuffler 150 can receive a respective plurality of messages from each of the client devices 130 and can randomly shuffle them so that the messages are randomly distributed amongst each other without regard to which of the plurality of different devices 130 generated each message. In some implementations, multiple shufflers can be used (e.g., sequentially) to provide added layer(s) of privacy assurance.

The system 100 also includes a server 110, such as a web server. The server 110 can be implemented using any suitable computing device(s). The server 110 can have one or more processors 112 and one or more memory devices 114. The server 110 can be implemented using one server device or a plurality of server devices. In implementations in which a plurality of devices are used, such plurality of devices can operate according to a parallel computing architecture, a sequential computing architecture, or a combination thereof.

The server 110 can also include a network interface used to communicate with one or more client devices 130 over the network. The network interface can include any suitable components for interfacing with one more networks, including for example, transmitters, receivers, ports, controllers, antennas, or other suitable components.

The one or more processors 112 can include any suitable processing device, such as a microprocessor, microcontroller, integrated circuit, logic device, or other suitable processing device. The one or more memory devices 114 can include one or more computer-readable media, including, but not limited to, non-transitory computer-readable media, RAM, ROM, hard drives, flash drives, or other memory devices. The one or more memory devices 114 can store information accessible by the one or more processors 112, including computer-readable instructions 116 that can be executed by the one or more processors 112.

The instructions 116 can be any set of instructions that when executed by the one or more processors 112, cause the one or more processors 112 to perform operations. For instance, the instructions 116 can be executed by the one or more processors 112 to implement a global updater 120. The global updater 120 can be configured to update a global model based at least in part on a sum or average of local updates computed at the client devices 130.

The instructions 116 can further include instructions that cause the server 110 to implement an analyzer 122. The analyzer 122 can determine the sum or average of local updates based on the shuffled messages. The analyzer 122 can perform any of the analysis techniques described herein, including Algorithm 2 shown in FIG. 4.

As shown in FIG. 1, the one or more memory devices 114 can also store data 118 that can be retrieved, manipulated, created, or stored by the one or more processors 112. The data 118 can include, for instance, local updates, global parameters, and other data. The data 118 can be stored in one or more databases. The one or more databases can be connected to the server 110 by a high bandwidth LAN or WAN, or can also be connected to server 110 through the network. The one or more databases can be split up so that they are located in multiple locales.

The server 110 can exchange data with one or more client devices 130 and/or shuffler 150 over the network. Any number of client devices 130 can be connected to the server 110 and/or shuffler 150 over the network. Each of the client devices 130 can be any suitable type of computing device, such as a general purpose computer, special purpose computer, laptop, desktop, mobile device, navigation system, smartphone, tablet, wearable computing device, gaming console, a display with one or more processors, or other suitable computing device.

The network can be any type of communications network, such as a local area network (e.g. intranet), wide area network (e.g. Internet), cellular network, or some combination thereof. The network can also include a direct connection between a client device 130 and the server 110. In general, communication between the server 110 and a client device 130 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The machine-learned models described in this specification and/or generated using techniques described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to enable privacy-preserving aggregation of private data, the method comprising:
    obtaining, by one or more computing devices, private data comprising a private value;
    producing, by the one or more computing devices based at least in part on the private value, a plurality of messages that respectively comprise a plurality of message values, wherein the plurality of message values together encode the private value for differentially private aggregation, wherein producing the plurality of messages comprises:
        randomly selecting, by the one or more computing devices, a message value for each of one or more first messages of the plurality of messages;
        determining, by the one or more computing devices, an intermediate sum of the message values of the one or more first messages; and
        setting, by the one or more computing devices, a message value of a final message of the plurality of messages equal to the private value minus the intermediate sum modulo a first parameter value; and
    transmitting, by the one or more computing devices over a communication channel, the plurality of messages, including the final message and the one or more first messages, for differentially private aggregation of the private value with a plurality of additional private values based on a plurality of additional messages respectively generated for the plurality of additional private values.

2. The computer-implemented method of claim 1, wherein randomly selecting, by the one or more computing devices, a message value comprises:
    uniformly and randomly sampling, by the one or more computing devices, one of a plurality of available values to serve as the message value for such first message.

3. The computer-implemented method of claim 2, wherein:
    the plurality of available values comprises a set of integers extending from zero to a sample control parameter value minus one; and
    the first parameter value is equal to the sample control parameter value.

4. The computer-implemented method of claim 2, wherein a number of the one or more first iterations is controlled by a message control parameter value.

5. The computer-implemented method of claim 1, wherein:
    the private value comprises a scaled private value produced by scaling an unscaled private value; and
    obtaining, by one or more computing devices, the private data comprising the private value comprises scaling, by the one or more computing devices, the unscaled private value by a scaling control parameter value to obtain the scaled private value.

6. The computer-implemented method of claim 1, wherein:
    the private value comprises a normalized private value produced by normalizing a raw private value; and
    obtaining, by one or more computing devices, the private data comprising the private value comprises normalizing, by the one or more computing devices, the raw private value according to an expected maximum private value.

7. The computer-implemented method of claim 6, further comprising scaling, by the one or more computing devices, the normalized private value by a scaling control parameter value to obtain a scaled private value.

8. The computer-implemented method of claim 1, wherein:
    the private value comprises a noised private value produced by adding noise to a raw private value; and
    obtaining, by one or more computing devices, the private data comprising the private value comprises pre-randomizing, by the one or more computing devices, the raw private value according to a shared noise probability to obtain the noised private value.

9. The computer-implemented method of claim 1, wherein one or more of the sampling control parameter value, the scaling control parameter value, and the message control parameter value comprises a user-specified hyperparameter or a learned hyperparameter.

10. The computer-implemented method of claim 1, wherein one or more of the sampling control parameter value, the scaling control parameter value, and the message control parameter value is greater than or equal to four.

11. The computer-implemented method of claim 1 wherein providing, by the one or more computing devices, the plurality of messages for aggregation comprises transmitting, by the one or more computing devices, the plurality of messages to a shuffler model configured to shuffle the plurality of messages with the plurality of additional messages.

12. The computer-implemented method of claim 1, wherein the one or more computing devices consist of a user device.

13. The computer-implemented method of claim 1, wherein the private value comprises one or more of:
- an update value for a parameter of a machine-learned model;
- a heavy hitter value;
- an entropy value;
- a quantization value; or
- a support size value.

14. The computer-implemented method of claim 1, further comprising:
- encrypting, by the one or more computing devices, at least one of the plurality of messages with a public key associated with a shuffler model configured to shuffle the plurality of messages.

* * * * *